United States Patent [19]
Chino et al.

[11] Patent Number: 6,084,015
[45] Date of Patent: Jul. 4, 2000

[54] RUBBER COMPOSITION

[75] Inventors: Keisuke Chino; Fumito Yatsuyanagi; Hiroyuki Kaido; Masahiro Ikawa, all of Hiratsuka; Masayoshi Ito, Toride, all of Japan

[73] Assignee: The Yokohama Rubber Co., Ltd., Tokyo, Japan

[21] Appl. No.: 09/091,739

[22] PCT Filed: Oct. 23, 1997

[86] PCT No.: PCT/JP97/03853

§ 371 Date: Jun. 24, 1998

§ 102(e) Date: Jun. 24, 1998

[87] PCT Pub. No.: WO98/18859

PCT Pub. Date: May 7, 1998

[30] Foreign Application Priority Data

Oct. 25, 1996 [JP] Japan ..................................... 8-284080
May 29, 1997 [JP] Japan ..................................... 9-140107
Jul. 17, 1997 [JP] Japan ..................................... 9-192792

[51] Int. Cl.$^7$ ....................................................... C08K 5/33

[52] U.S. Cl. ........................... 524/189; 524/190; 524/236; 524/258; 524/260

[58] Field of Search ..................................... 524/189, 190, 524/236, 258, 260

[56] References Cited

U.S. PATENT DOCUMENTS 4,306,953  12/1981  Schlesinger ........................ 204/159.11

*Primary Examiner*—Edward J. Cain
*Attorney, Agent, or Firm*—Arent Fox Kintner Plotkin & Kahn, PLLC

[57] ABSTRACT

A rubber composition comprising a diene rubber, a reinforcing agent and a compound containing radicals capable of being stably present at room temperature in the presence of oxygen in the molecule thereof, selected from the group consisting of nitroxide radicals, hydrazyl radicals, allyloxyl radicals, and trityl radicals and the analogues thereof or a compound having at least one substituent group selected from amino groups, isocyanate groups, hydroxyl groups, carboxyl groups, oxirane groups, and thiirane groups.

16 Claims, 1 Drawing Sheet

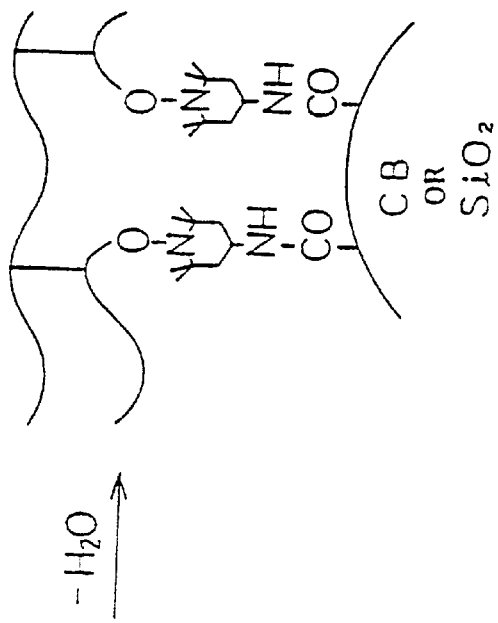
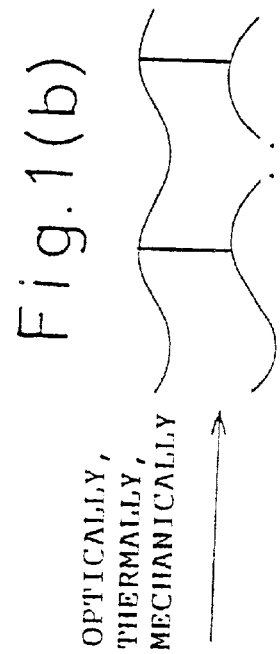
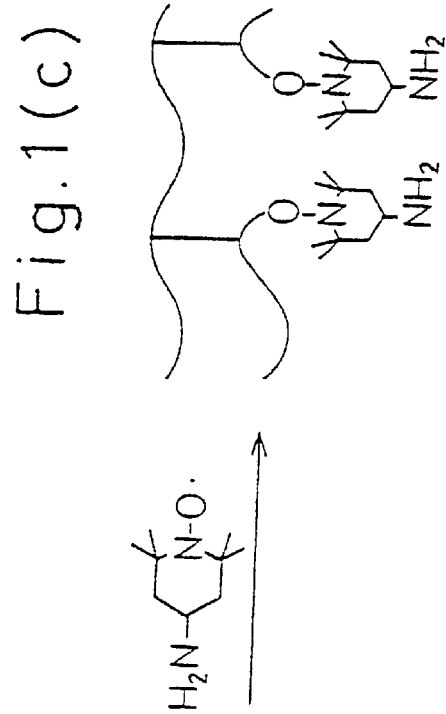
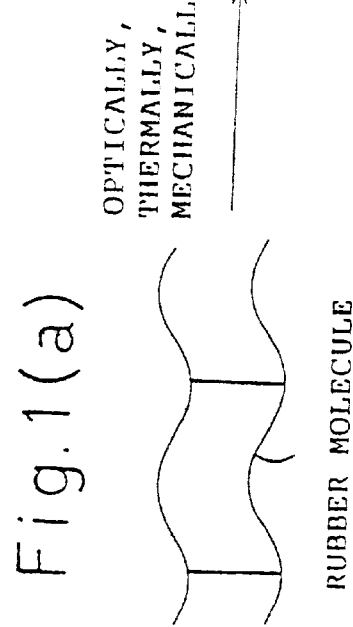

RUBBER COMPOSITION

TECHNICAL FIELD

The present invention relates to a rubber composition. More specifically it relates to a rubber composition obtained by compounding a compound containing free radicals having a powerful radical trapping character into a rubber composition, which is superior in processability, has a high gripping force and low heat buildup, prevents oxidative aging during abrasion, improves the abrasion resistance, and is superior in the balance of the high wet braking performance and low rolling resistance (i.e., tan δ balance).

BACKGROUND ART

Various attempts have been made to improve the processability of rubber compositions, particularly rubber compositions for pneumatic tires, and the other properties of tires and other products. There is particularly strong need for a rubber composition superior in processability, high in gripping force of the tire, low in heat buildup, and improved in abrasion resistance. For example, Japanese Unexamined Patent Publication (Kokai) No. 62-148544 discloses a rubber composition containing a reinforcing filler and isomaleimide compounded with a natural rubber or synthetic diene rubber, to obtain the improved green strength and green modulus, a low heat buildup and excellent crack growth resistance. Further, Japanese Unexamined Patent Publication (Kokai) No. 7-304305 discloses a pneumatic tire obtained from a composition comprised of rubber in which a mixture of p-phenylene diamine antioxidant, 2,2,4-trimethyl-1,2-dehydroquinoline (or its derivative) and a specific carbon black is compounded, whereby, while maintaining an excellent steering stability and high grip performance, the abrasion resistance is improved. Further, there are needs for a rubber composition superior in processability, high in abrasion resistance when made a tire, and superior in the balance between the high wet braking performance and low rolling resistance. The stabilization of a polymer with a stable free radical is described in Japanese Unexamined Patent Publication (Kokai) No. 8-239510. The effect of preventing rubber deterioration with a stable free radical has been proposed in Japanese Patent Application No. 8-284080. On the other hand, the fact that a reaction of a rubber having a reactive group such as an amino group with a carbon black reduces the hysteresis and decreases the rolling resistance is described in, for example, Japanese Unexamined Patent Publication (Kokai) No. 8-269131. Further, Japanese Unexamined Patent Publication (Kokai) No. 8-283461, Japanese Unexamined Patent Publication (Kokai) No. 8-283462, etc. disclose rubber and carbon black are reacted using thiadiazole or a hydrazide compound, whereby the dispersibility is improved and the heat buildup is reduced.

DISCLOSURE OF THE INVENTION

Accordingly, an object of the present invention is to provide a rubber composition having a superior processability, superior balance of high grip/low heat buildup, and improved abrasion resistance.

Another object of the present invention is to provide a rubber composition having a superior processability, superior balance of high wet braking performance/low rolling resistance (i.e., tan δ balance), and improved abrasion resistance.

In accordance with the present invention, there is provided a rubber composition comprising 100 parts by weight of at least one diene rubber at least 40 parts by weight of at least one reinforcing agent and 0.1 to 10 parts by weight of at least one compound containing, in the molecule thereof, a radical capable of being stably present at room temperature in the presence of oxygen, selected from the group consisting of nitroxide radicals, hydrazyl radicals, allyloxyl radicals, and trityl radicals and the analogues thereof.

In accordance with another aspect of the present invention, there is provided a rubber composition comprising 100 parts by weight of at least one diene rubber, at least 20 parts by weight of at least one reinforcing agent and 0.1 to 10 parts by weight of a compound containing at least one radical selected from the group consisting of nitroxide radicals, hydrazyl radicals, allyloxyl radicals, and trityl radicals having at least one substituent group selected from the group consisting of an amino group, isocyanate group, hydroxyl group, carboxyl group, oxirane group, and thiirane group and capable of being stably present at room temperature in the presence of oxygen.

BRIEF DESCRIPTION OF THE DRAWINGS

The present invention will be explained below in the structure and functional effects thereof with reference to the drawings. FIG. 1(a), FIG. 1(b), FIG. 1(c), and FIG. 1(d) schematically illustrate the functions of preventing deterioration or aging in the rubber composition according to the present invention.

BEST MODE FOR CARRYING OUT THE INVENTION

The rubber compounded into the rubber composition of the present invention as the main component may be any diene rubber generally used in various types of rubber compositions in the past, for example, diene rubbers such as natural rubbers (NR), polyisoprene rubbers (IR), various styrene-butadiene copolymer rubbers (SBR), various polybutadiene rubbers (BR), acrylonitrile-butadiene copolymer rubbers (NBR), butyl rubbers (IIR), alone or in any blend thereof.

As the reinforcing agent compounded into the rubber composition according to the present invention, for example, carbon black, silica, etc. may be mentioned. In the first aspect, at least 40 parts by weight, preferably 50 to 120 parts by weight, are compounded into 100 parts by weight of the diene rubber. If the amount is too small, the reinforcement required for the rubber composition unpreferably cannot be obtained.

The carbon black capable of being used in the rubber composition of the present invention has a nitrogen specific surface area ($N_2SA$) of, preferably, 20 to 200 $m^2/g$, more preferably 50 to 170 $m^2/g$, and a DBP oil absorption of, preferably, 60 to 130 ml/100 g, more preferably 80 to 120 ml/100 g.

The silica capable of being used in the rubber composition of the present invention may include any silica (or white carbon) capable of being used for rubber compositions and preferably has an $N_2SA$ of 80 to 300 $m^2/g$, more preferably 100 to 250 $m^2/g$, and a DBP oil absorption of 100 to 300 ml/100 g, more preferably 120 to 250 ml/100 g.

Note that the methods of measurement of the properties of the carbon black and silica are as follows:
a) Nitrogen Specific Surface Area ($N_2SA$)
According to method C of ASTM-D3037-78 "Standard Methods of Treating Carbon Black-Surface Area by Nitrogen Adsorption".

b) DBP Oil Adsorption

Measured according to ASTM-D-3493.

According to the first aspect of the present invention, as an essential component, 0.1 to 10 parts by weight, preferably 0.5 to 5 parts by weight, of at least one compound containing, in the molecule thereof, a radical capable of being stably present at room temperature and in the presence of oxygen and selected from the group consisting of nitroxide radicals, hydrazyl radicals, allyloxyl radicals, and trityl radicals and the analogues thereof is compounded into 100 parts by weight of a diene rubber. If the amount is too small, the desired effect cannot be obtained, while if too large, the intended reinforcement necessary for the rubber composition cannot be obtained, which is also not preferable.

As the compound containing in its molecule a radical stable at room temperature which can be used in the first aspect of the present invention, the following compounds may be illustrated:

Nitroxide Radicals

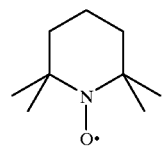

2, 2, 6, 6-tetramethylpiperidinyloxy
(TEMPO)

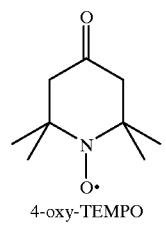

4-oxy-TEMPO

General formulae:

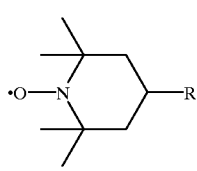

(1)

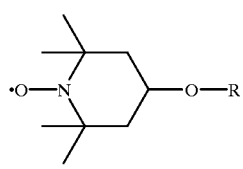

(2)

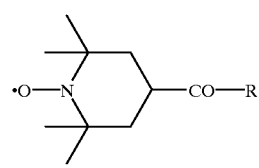

(3)

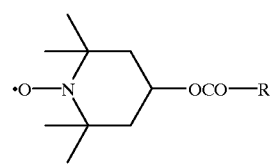

(4)

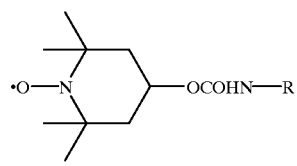

(5)

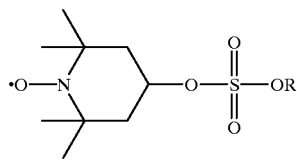

(6)

where, in the above formulas (1) to (6), R 30 represents $C_1$ to $C_{30}$ hydrocarbon which may contain O, N, S, P, F, Cl, Br, or I.

Specific examples are indicated below:

(1)

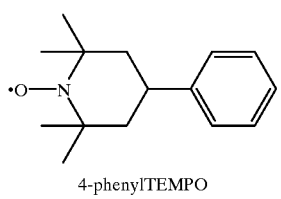 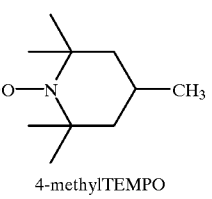 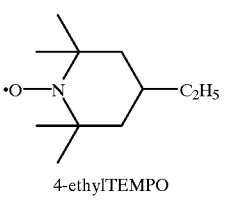 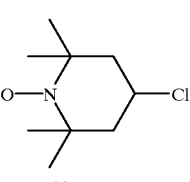

4-phenylTEMPO    4-methylTEMPO    4-ethylTEMPO    4-chloroTEMPO (2)

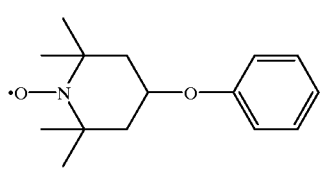 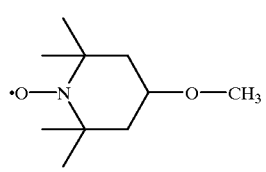 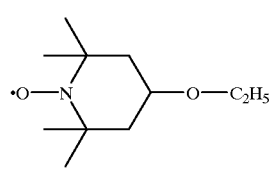

4-phenoxyTEMPO    4-methoxyTEMPO    4-ethoxyTEMPO

-continued
(3)
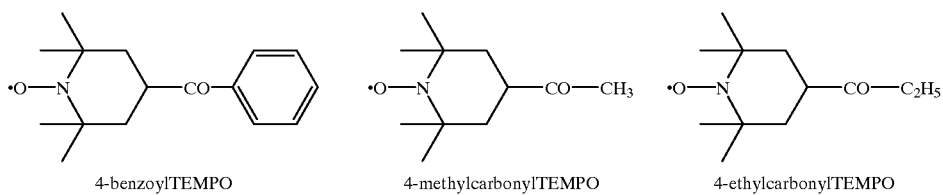
(4)
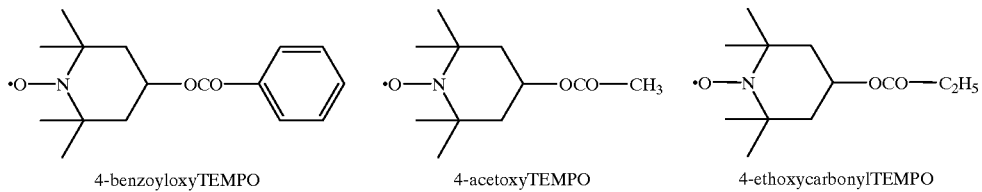
(5)
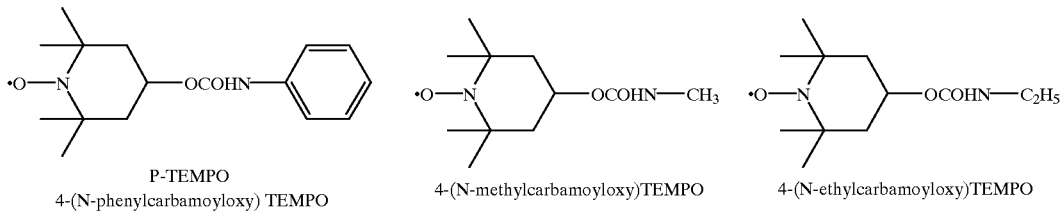
(6)
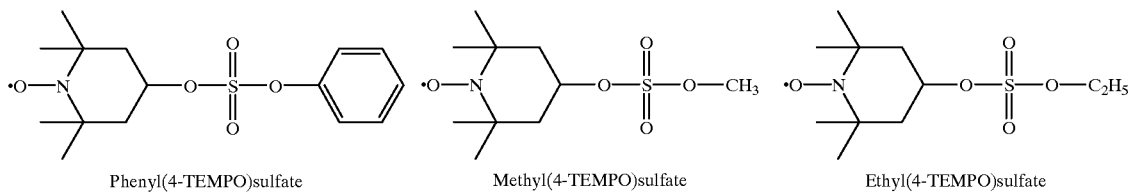
Other examples are as follows:
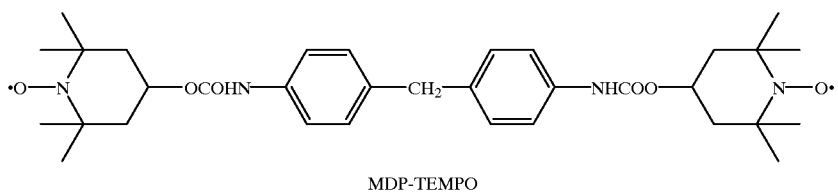
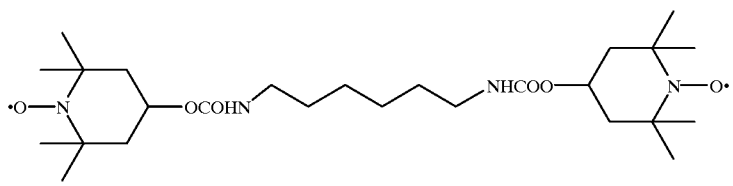
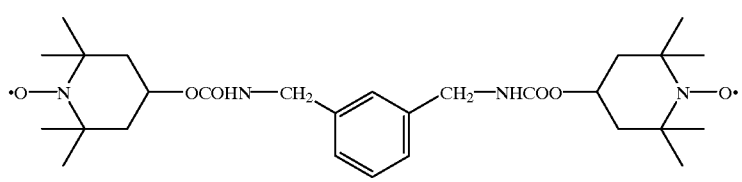
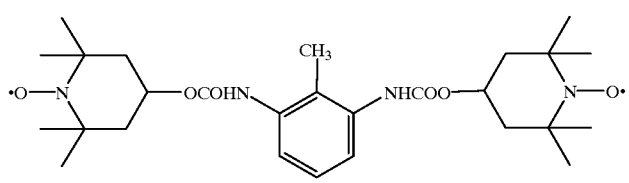

-continued
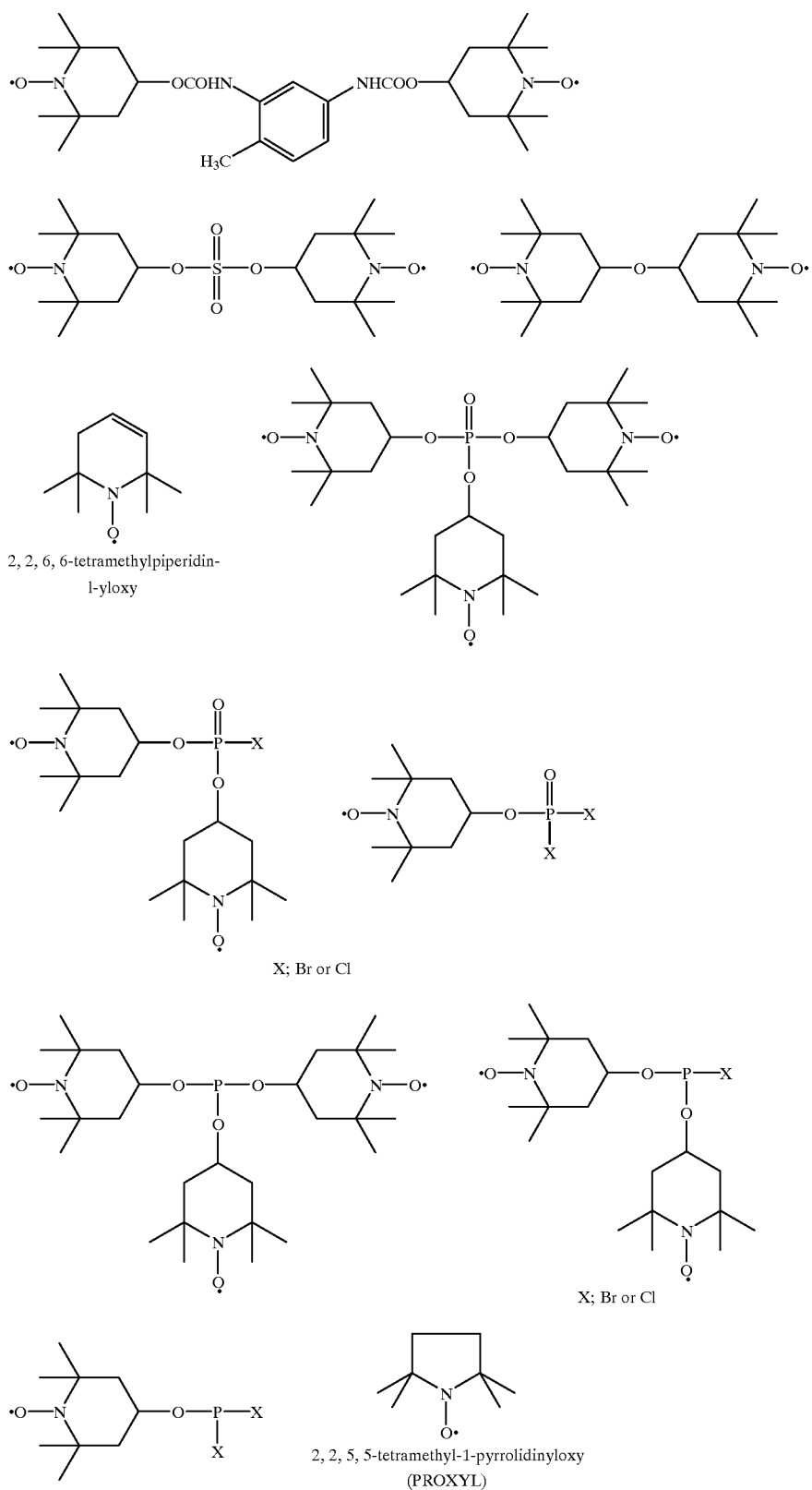

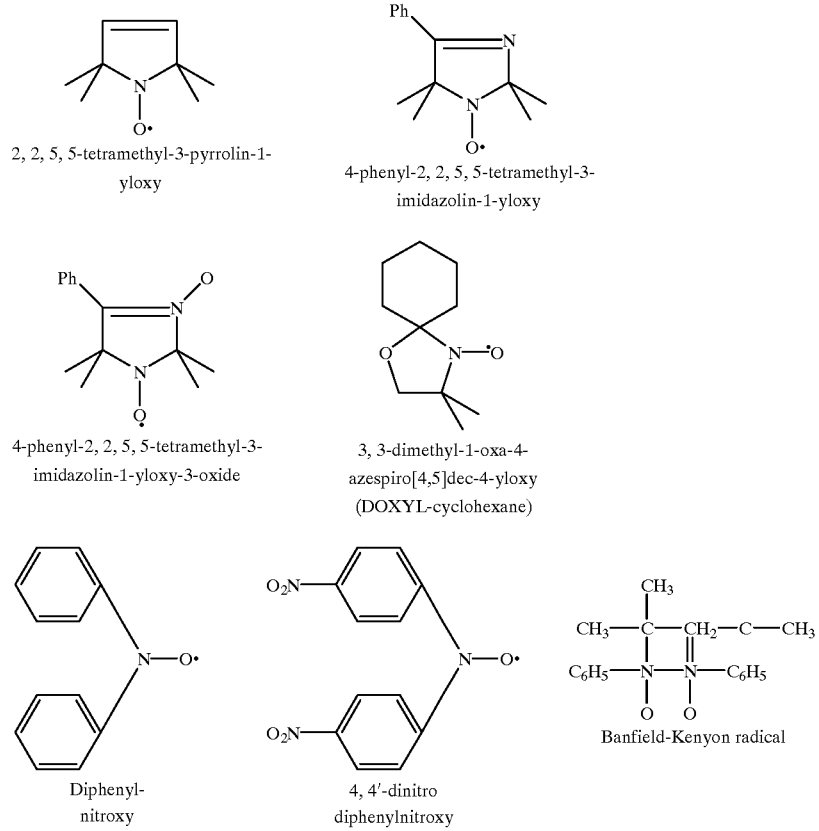
2, 2, 5, 5-tetramethyl-3-pyrrolin-1-yloxy
4-phenyl-2, 2, 5, 5-tetramethyl-3-imidazolin-1-yloxy
4-phenyl-2, 2, 5, 5-tetramethyl-3-imidazolin-1-yloxy-3-oxide
3, 3-dimethyl-1-oxa-4-azespiro[4,5]dec-4-yloxy (DOXYL-cyclohexane)
Diphenyl-nitroxy
4, 4′-dinitro diphenylnitroxy
Banfield-Kenyon radical
•ON(SO$_3$K)$_2$ Fermi salt
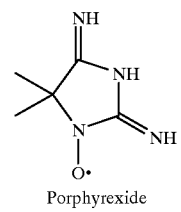
Porphyrexide
Hydrazyl Radicals
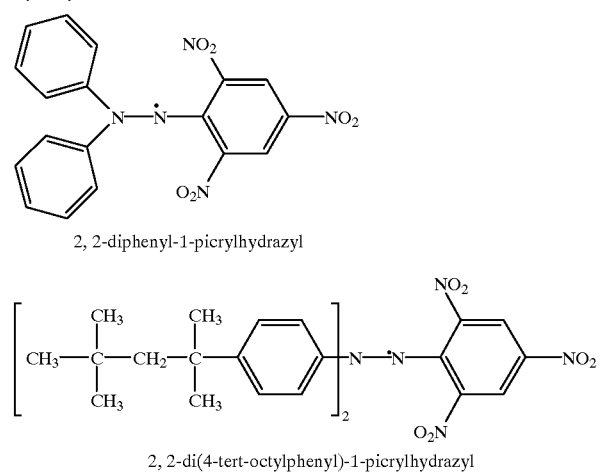
2, 2-diphenyl-1-picrylhydrazyl
2, 2-di(4-tert-octylphenyl)-1-picrylhydrazyl -continued Allyloxy Radicals

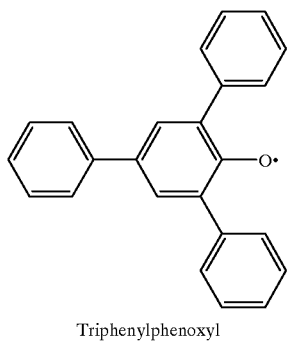
Triphenylphenoxyl

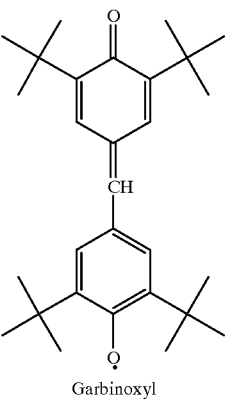
Garbinoxyl

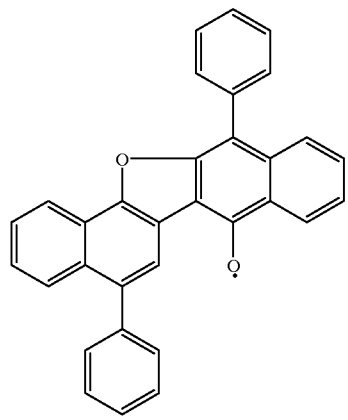
5, 12-diphenyl-7-oxyldinaphtha-[1, 2-b-2', 3-d]furan

Trityl Radicals

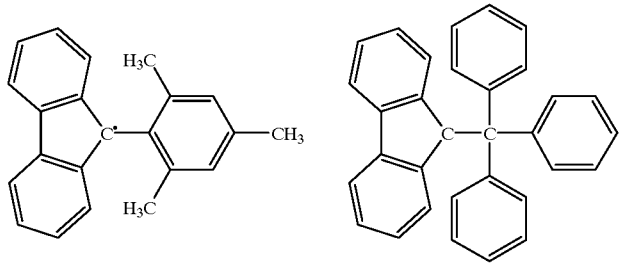

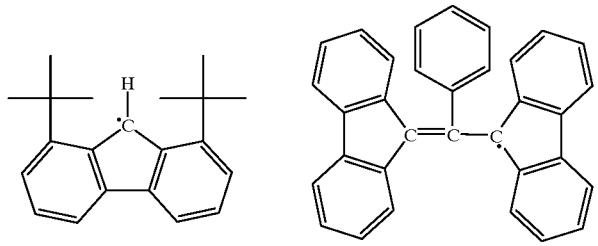
α, γ-bisdiphenylene-β-phenylallyl

As explained above, according to the first aspect of the present invention, there is provided a rubber composition in which a compound having a free radical having a powerful radical trapping character is compounded. In the present invention, for example, the rubber adsorption ingredients formed on the carbon black are controlled to reduce the effect of the rubber on the rubber matrix ingredient far from the carbon black in the rubber composition as much as possible, whereby the physical properties of the rubber can be improved. As the method for this, it is possible to efficiently trap the radicals generated due to the mechanochemical cleavage of the rubber chains with a shear force generated during the mixing of the carbon black and the rubber with the compound containing free radicals stably present at ordinary temperature in the presence of oxygen to thereby prevent cross-linking of the rubber and reduce the excessive rubber adsorption ingredient. By this, it is possible to reduce the rubber viscosity at the time when not vulcanized and create a rubber having a good tan δ balance and obtain a rubber having a good processability and a good balance of the wet braking performance/low rolling resistance. Further, the compound having the normally stable free radicals trap the radicals generated by the mechanochemical cleavage of the rubber chains by the shear force generated during abrasion so as to prevent cross-linking of the rubber, to suppress the generation of microdomains, to prevent a reduction in the destructive physical properties, whereby the abrasion resistance is improved.

As the reinforcing agent compounded into the second aspect of the rubber composition of the present invention, for example, carbon black and silica may be mentioned. In this case, at least 20 parts by weight, preferably 40 to 60 parts by weight, are compounded into 100 parts by weight of the diene rubber. If the amount is too small, the reinforcement required for the rubber composition unpreferably cannot be obtained.

According to the second aspect of the present invention, as the essential component, 0.1 to 10 parts by weight, preferably 0.5 to 5 parts by weight, of a compound having at least one radical selected from the group consisting of a nitroxide radical, hydrazyl radical, allyloxyl radical, and trityl radical having at least one substituent group selected from the group consisting of an amino group, isocyanate group, hydroxyl group, carboxyl group, oxirane group, and thiirane group and capable of being stably present at room temperature and in the presence of oxygen is compounded into 100 parts by weight of a diene rubber. If the amount is too small, the desired effect cannot be obtained, while conversely if too large, the reinforcement required for the rubber composition unpreferably cannot be obtained.

As the compound which may be used in the second aspect of the present invention, the following compounds may be illustrated:

Substituted Nitroxide Radical (Piperidinyloxy) (see Formula (I))

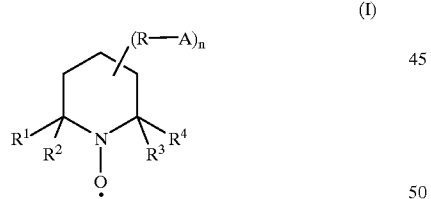

(I)

wherein, in formula (I), R is at least one of C, O, N, S, P, a $C_1$ to $C_{30}$ alkylene group, and a $C_6$ to $C_{30}$ aryl group or a single bond, $R^1$ to $R^4$ are, independently, hydrogen, or $C_1$ to $C_4$ alkyl group such as methyl group, ethyl group, A is independently an amino group, isocyanate group, hydroxyl group, carboxyl group, oxirane group, or thiirane group, and n is an integer of 1 to 6.

Representative examples of the compound having substituted nitroxide radicals shown in formula (I) and the other compounds containing substituted nitroxide radicals are as follows:

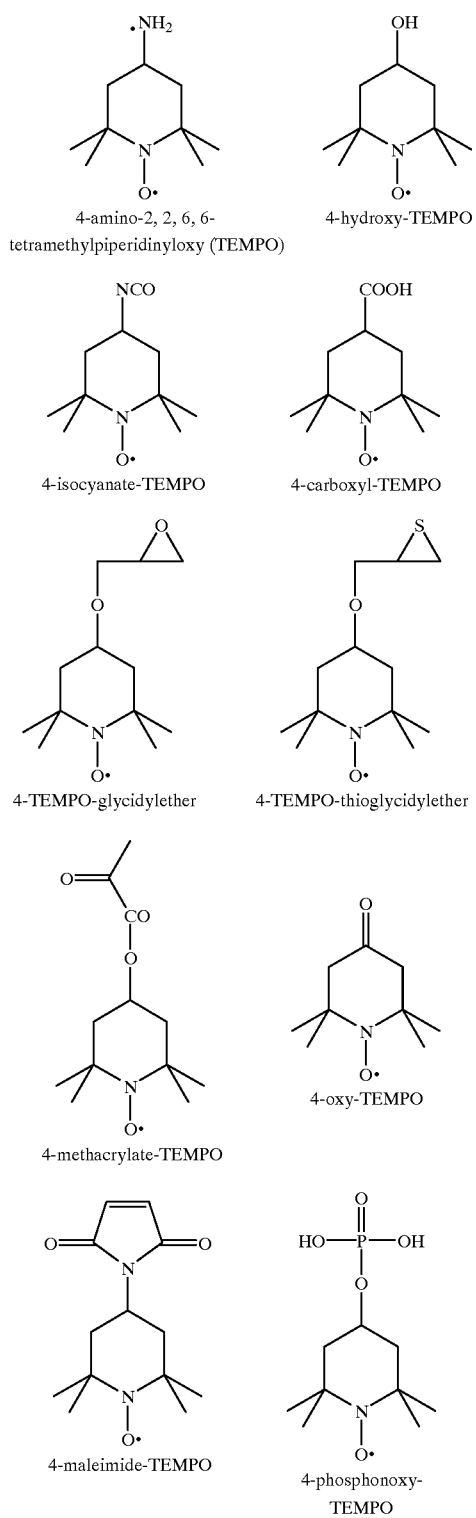

15

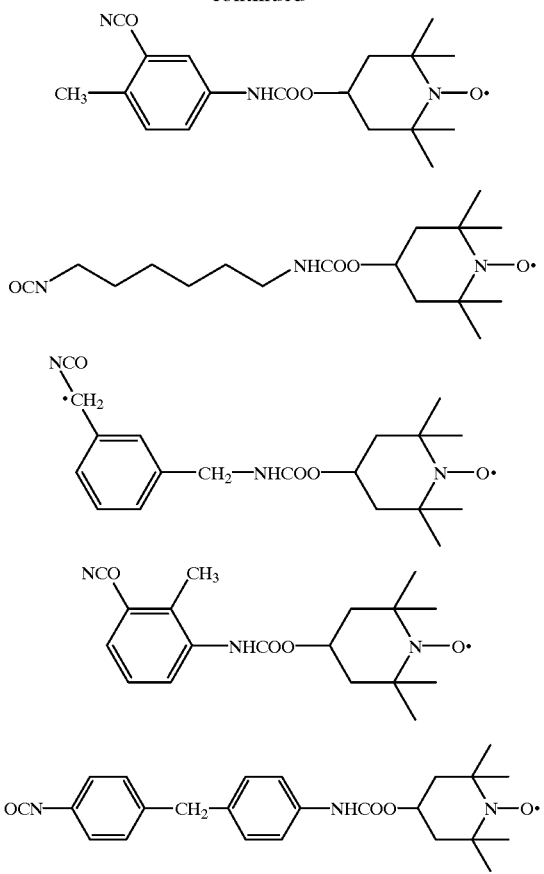

Substituted Nitroxide Radical (Pyrrolidinyloxy) (see Formula (II) or (III))

$$\begin{array}{c}(R\!-\!\!A)_n\\ \diagdown\\ R^1\!-\!\!\overset{|}{\underset{R^2}{\text{N}}}\!-\!\!R^4\\ \underset{O}{|}\end{array} \quad \text{or} \quad \text{(II)}$$

$$\begin{array}{c}(R\!-\!\!A)_n\\ \diagdown\\ R^1\!-\!\!\overset{|}{\underset{R^2}{\text{N}}}\!-\!\!R^4\\ \underset{O}{|}\end{array} \quad \text{(III)}$$

wherein, R, $R^1$ to $R^4$, A, and n are as defined above.

Representative examples of compounds containing substituted nitroxide radicals shown in formula (II) or (III) are as follows:

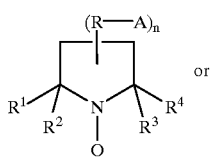

3-amino-2, 2, 5, 5-tetramethyl-1-pyrrolidinyloxy (3-amino-PROXYL)

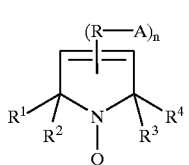

3-hydroxy-PROXYL

16

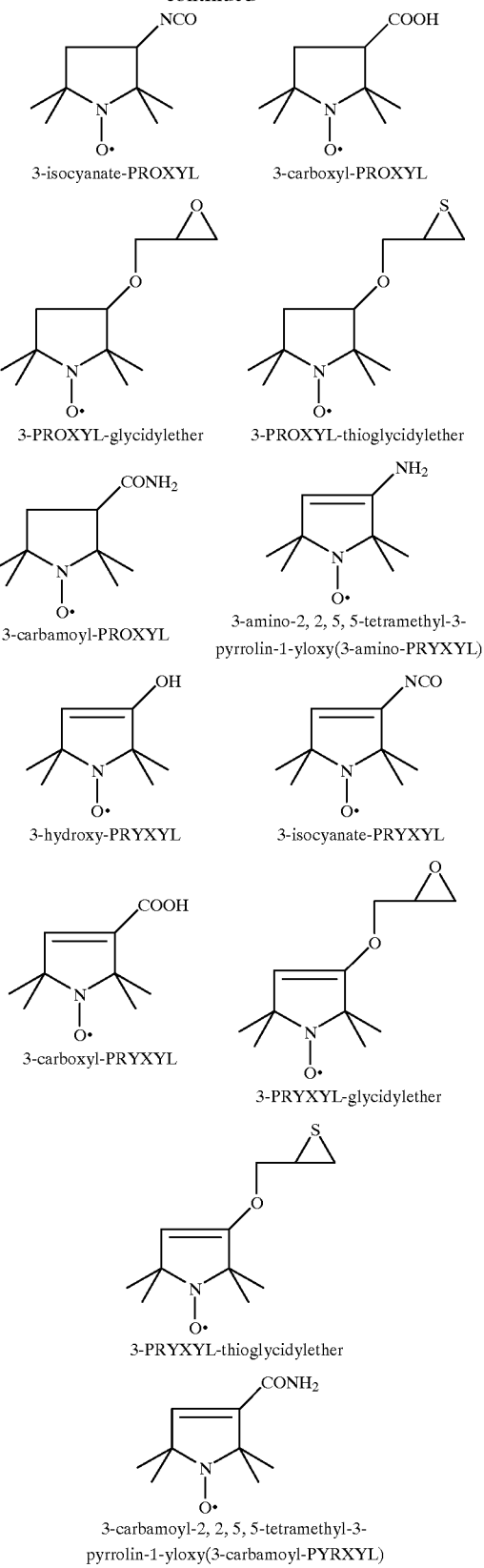

As the other examples of the nitroxide radicals, the following substituents of the radical compounds can also be mentioned as compounds containing nitroxide radicals of the present invention:

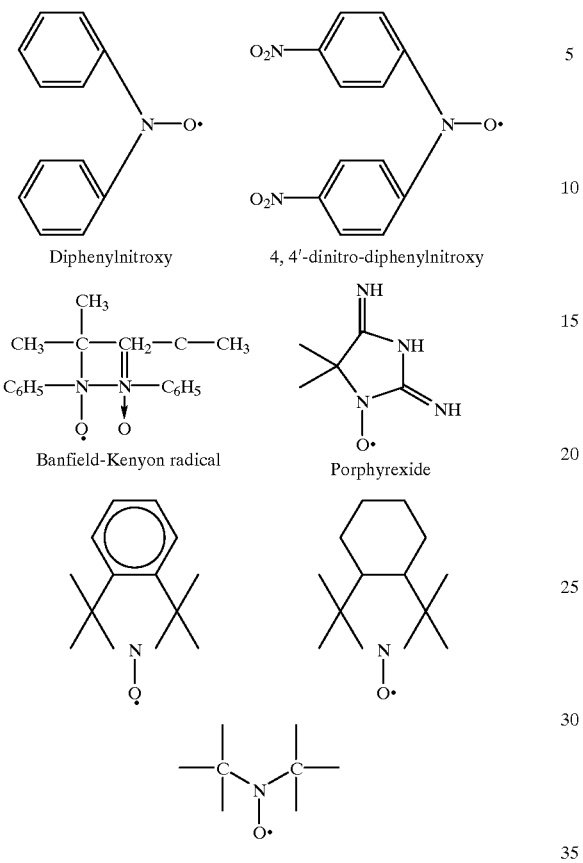

Diphenylnitroxy  4,4'-dinitro-diphenylnitroxy

Banfield-Kenyon radical  Porphyrexide

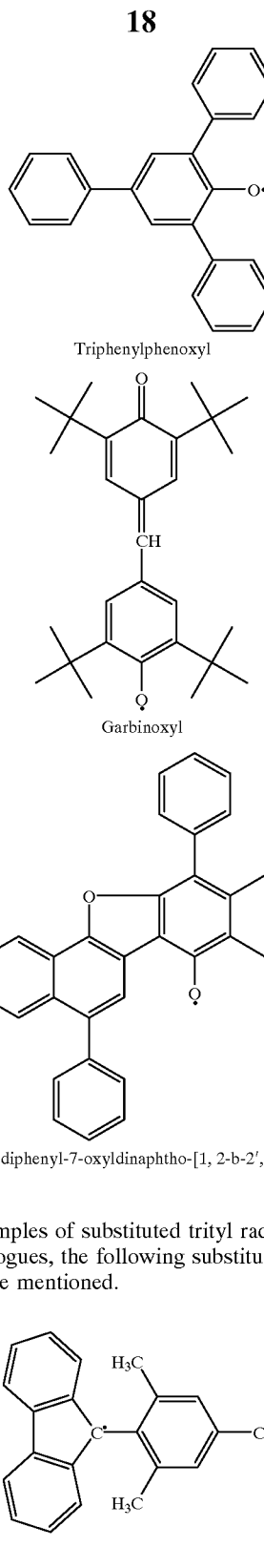

Triphenylphenoxyl

Garbinoxyl 5,12-diphenyl-7-oxyldinaphtho-[1, 2-b-2', 3-d]furan

Giving examples of substituted hydrazyl radical compounds, the following substituents of the compounds may be mentioned.

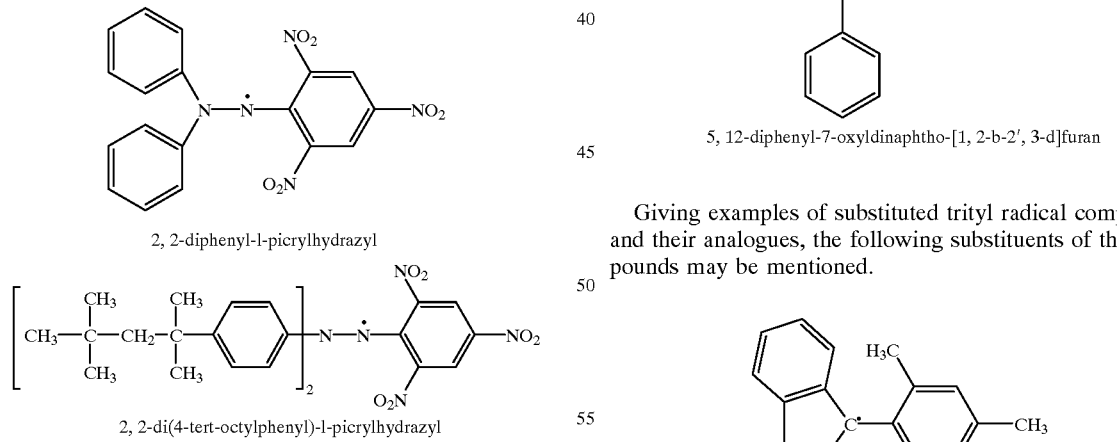

2,2-diphenyl-1-picrylhydrazyl 2,2-di(4-tert-octylphenyl)-1-picrylhydrazyl

Giving examples of substituted allyloxy radical compounds, the following substituents of the compounds may be mentioned.

Giving examples of substituted trityl radical compounds and their analogues, the following substituents of the compounds may be mentioned.

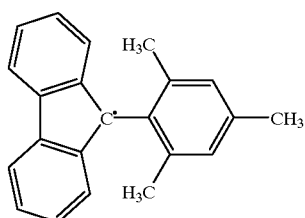

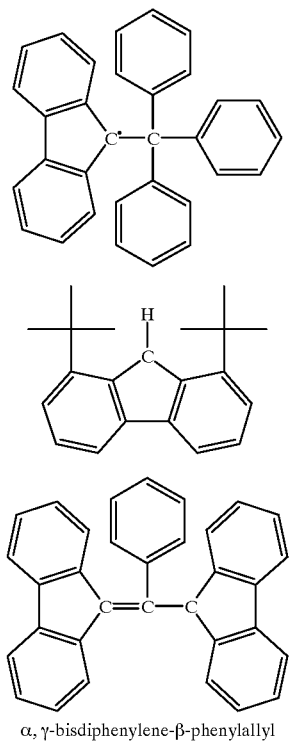

α, γ-bisdiphenylene-β-phenylallyl

According to the second aspect of the present invention, as explained above, by using a stable free radical compound having specific substituent groups, it is possible to obtain a rubber composition having superior abrasion resistance and superior tan δ balance (0° C./60° C.) (that is, high wet braking performance/low rolling resistance balance). A schematic explanation of this taking as an example 4-amino-TEMPO follows:

As shown in FIG. 1, when the cross-linked structure rubber molecule (see FIG. 1(a)) is optically, thermally, or mechanically cleavage and radicals are generated (see FIG. 1(b)), the radicals are immediately trapped by the 4-amino-TEMPO as shown in FIG. 1(c), and therefore, it is possible to effectively prevent the deterioration or aging or other phenomena of the rubber due to the generation of free radicals in the rubber molecule. However, as a result of this trapping of radicals, the number of the terminals of the rubber increase and, as a result, the physical properties of the rubber make worse. Therefore, in the present invention, by introducing an amino group, an isocyanate group, a hydroxyl group, a carboxyl group, etc. which are reactive with the hydroxy group or carbonyl group on the surface of the carbon black or silica into the free radical (nitroxide) compound, as shown in FIG. 1(d), the terminals of the trapped rubber react with the surface of the carbon black (or silica), prevent an increase of the number of terminals, and produce a strong carbon gel (or gel with silica), whereby the physical properties of the rubber are improved. In particular, it is possible to improve the abrasion resistance and remarkably improve the high wet braking performance/low rolling resistance balance.

The rubber composition according to the present invention may contain, in addition to the above-mentioned essential components, a vulcanization or cross-linking accelerator, various types of oil, an antioxidant, plasticizer, and other various additives generally compounded for tires or for other general rubber use. The blend may be mixed and vulcanized to form a composition by a general method and used for vulcanization or cross-linking. As long as the amounts of these additives do not contravene the object of the present invention, it is possible to use the conventional general amounts of formulation.

EXAMPLES

The present invention will be explained below in further detail using Examples, Standard Examples, and Comparative Examples, but the scope of the present invention is, of course, not limited to these Examples.

Standard Example I-1, Examples I-1 to I-4, and Comparative Examples I-1 to I-2

Preparation of Samples

The ingredients other than the vulcanization accelerator and sulfur in the formulations shown in Table I-1 were mixed in a 1.8 liter closed type mixer for 3 to 5 minutes. When the temperature of the mixture reaches 165±5° C., the mixtures were discharged. The vulcanization accelerator and sulfur were then mixed by an 8-inch open roll with the masterbatch obtained above to obtain a rubber composition. The unvulcanized physical properties of the rubber compositions thus obtained were measured.

Next, the composition was vulcanized by pressing the composition in 15×15×0.2 cm mold at 160° C. for 20 minutes to prepare the desired test piece (i.e., rubber sheet) which was then evaluated for vulcanized physical properties.

TABLE I-1

| | Stand. Ex. I-1 | Ex. I-1 | Ex. I-2 | Ex. I-3 | Ex. I-4 | Comp. Ex. I-1 | Comp. Ex. I-2 |
|---|---|---|---|---|---|---|---|
| [Composition (parts by weight)] | | | | | | | |
| Natural rubber (NR)[*1] | 100.0 | 100.0 | 100.0 | 100.0 | 100.0 | 100.0 | 100.0 |
| Carbon black[*2] | 50.0 | 50.0 | 50.0 | 50.0 | 50.0 | 50.0 | 50.0 |
| TEMPO[*3] | — | 1.0 | 3.0 | — | — | — | — |
| DPPH[*4] | — | — | — | 3.0 | — | — | — |
| Triphenyl-phenoxyl[*5] | — | — | — | — | 3.0 | — | — |
| Zinc White #3 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 |
| Antioxidant 6C[*6] | 1.0 | 1.0 | 1.0 | 1.0 | 1.0 | 1.0 | 5.0 |
| Aromatic process oil | — | — | — | — | — | 5.0 | — |
| Oil treated powdered sulfur | 1.1 | 1.1 | 1.1 | 1.1 | 1.1 | 1.1 | 1.1 |
| Vulcanization accelerator NS[*7] | 1.1 | 1.1 | 1.1 | 1.1 | 1.1 | 1.1 | 1.1 |
| [Unvulcanized physical properties] | | | | | | | |
| Mooney viscosity | 70 | 61 | 57 | 58 | 62 | 63 | 67 |
| [Vulcanized physical properties] | | | | | | | |
| tan δ (0° C.) | 0.239 | 0.235 | 0.238 | 0.237 | 0.235 | 0.235 | 0.235 |
| tan δ (60° C.) | 0.103 | 0.100 | 0.094 | 0.091 | 0.101 | 0.115 | 0.110 |

TABLE I-1-continued

|  | Stand. Ex. I-1 | Ex. I-1 | Ex. I-2 | Ex. I-3 | Ex. I-4 | Comp. Ex. I-1 | Comp. Ex. I-2 |
|---|---|---|---|---|---|---|---|
| Abrasion resistance (index) | 100 | 111 | 121 | 117 | 110 | 85 | 102 |

*1: SIR-20 (natural rubber)
*2: N220 (made by Showa Cabot, carbon black, $N_2SA$ = 112 $m^2$/g, DBP oil adsorption = 112 ml/100 g)
*3: 2,2,6,6-tetramethylpiperidinyloxy (made by Aldrich Chemical Col. Inc.)
*4: 2,2-diphenyl-1-picrylhydrazyl (made by Aldrich Chemical Co. Inc.)
*5: Made by Aldrich Chemical Co. Inc.
*6: Made by Sumitomo Chemical, N-phenyl-N'-(1,3-dimethylbutyl)-p-phenylenediamine
*7: Made by Ouchi Shinko Chemical Industrial, N-tert-butyl-2-benzothiazole-sulfenamide The test methods of the unvulcanized physical properties and the vulcanized physical properties of the compositions obtained in the Examples were as follows:

Unvulcanized Physical Properties
1) Mooney viscosity

Measured according to JIS (Japan Industrial Standard) K 6300 at 100° C.

Vulcanized Physical Properties
1) tan δ

A viscoelasticity spectrometer (made by Toyo Seiki) was used to measure tan δ at temperatures of 0° C. and 60° C., an initial strain of 10%, a dynamic strain of +2%, and a frequency of 20 Hz. The tan δ at 0° C. is the measure of the gripping force on wet roads and the tan δ at 60° C. is on dry roads. In both cases, the larger the tan δ, the greater the gripping force of the tire. Further, the tan δ at 60° C. conversely shows the braking resistance. In this case, the smaller the value, the smaller the braking resistance.

2) Abrasion Resistance

A Lambourn abrasion tester (made by Iwamoto Seisakusho) was used to measure the abrasion loss at a temperature of 20° C. The wear loss was indicated as an index.

Abrasion resistance (index)=[(loss of Standard Example)/(loss of sample)]×100

(Note) The larger the index, the better the abrasion resistance.

Standard Example I-2, Examples I-5 to I-8, and Comparative Examples I-3 to I-4

The same procedure was follows as in the previous Examples to prepare rubber compositions of formulations shown in Table I-2 which were then evaluated in physical properties. The results are shown in Table I-2.

TABLE I-2

|  | Stand. Ex. I-2 | Ex. I-5 | Ex. I-6 | Ex. I-7 | Ex. I-8 | Comp. Ex. I-3 | Comp. Ex. I-4 |
|---|---|---|---|---|---|---|---|
| [Composition (parts by weight)] | | | | | | | |
| Polyisoprene rubber (IR)*1 | 100.0 | 100.0 | 100.0 | 100.0 | 100.0 | 100.0 | 100.0 |
| Carbon black*2 | 50.0 | 50.0 | 50.0 | 50.0 | 50.0 | 50.0 | 50.0 |
| TEMPO*2 | — | 1.0 | 3.0 | — | — | — | — |
| DPPH*2 | — | — | — | 1.0 | 3.0 | — | — |
| Triphenyl- phenoxyl*2 | — | — | — | — | — | 3.0 | — |
| Zinc White #3 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 |
| Antioxidant 6C*2 | 1.0 | 1.0 | 1.0 | 1.0 | 1.0 | 1.0 | 5.0 |
| Aromatic process oil | — | — | — | — | — | 5.0 | — |
| Oil treated powdered sulfur | 1.1 | 1.1 | 1.1 | 1.1 | 1.1 | 1.1 | 1.1 |
| Vulcanization accelerator NS*2 | 1.1 | 1.1 | 1.1 | 1.1 | 1.1 | 1.1 | 1.1 |
| [Unvulcanized physical properties] | | | | | | | |
| Mooney viscosity | 70 | 61 | 57 | 58 | 62 | 63 | 67 |
| [Vulcanized physical properties] | | | | | | | |
| tan δ (0° C.) | 0.319 | 0.335 | 0.337 | 0.330 | 0.328 | 0.235 | 0.235 |
| tan δ (60° C.) | 0.190 | 0.182 | 0.179 | 0.180 | 0.187 | 0.115 | 0.110 |
| Abrasion resistance (index) | 100 | 115 | 120 | 118 | 112 | 81 | 104 |

*1: Nipol IR2200 (made by Nihon Zeon, IR)
*2: See notes of Table I-1.

Standard Examples I-3 to I-4, Examples I-9 to I-11, and Comparative Examples I-5 to I-6

The same procedure was follows as in the previous Examples to prepare rubber compositions of formulations shown in Table I-3 which were then evaluated in physical properties. The results are shown in Table I-3.

TABLE I-3

|  | Stand. Ex. I-3 | Ex. I-9 | Comp. Ex. I-5 | Stand. Ex. I-4 | Ex. I-10 | Ex. I-11 | Comp. Ex. I-6 |
|---|---|---|---|---|---|---|---|
| [Composition (parts by weight)] | | | | | | | |
| SBR*1 | 100.0 | 100.0 | 100.0 | — | — | — | — |
| SBR*2 | — | — | — | 150.0 | 150.0 | 150.0 | 150.0 |
| Carbon black*3 | 50.0 | 50.0 | 50.0 | — | — | — | — |
| Carbon black*4 | — | — | — | 95.0 | 95.0 | 95.0 | 95.0 |
| TEMPO*5 | — | 3.0 | — | — | 3.0 | — | — |
| DPPH*5 | — | — | 3.0 | — | — | 3.0 | — |
| Zinc White #3 | 3.0 | 3.0 | 3.0 | 3.0 | 3.0 | 3.0 | 3.0 |
| Industrial stearic acid | 1.0 | 1.0 | 1.0 | 1.0 | 1.0 | 1.0 | 1.0 |
| Antioxidant 6C*5 | 1.0 | 1.0 | 5.0 | 1.0 | 1.0 | 1.0 | 1.0 |
| Aromatic process oil | — | — | — | — | — | — | — |
| Oil treated powdered sulfur | 2.4 | 2.4 | 2.4 | 2.4 | 2.4 | 2.4 | 2.4 |
| Vulcanization | 1.6 | 1.6 | 1.6 | 1.6 | 1.6 | 1.6 | 1.6 |

TABLE I-3-continued

|  | Stand. Ex. I-3 | Ex. I-9 | Comp. Ex. I-5 | Stand. Ex. I-4 | Ex. I-10 | Ex. I-11 | Comp. Ex. I-6 |
|---|---|---|---|---|---|---|---|
| accelerator CZ*[6] | | | | | | | |
| Vulcanization accelerator DPG*[7] | 0.1 | 0.1 | 0.1 | 0.1 | 0.1 | 0.1 | 0.1 |
| [Unvulcanized physical properties] | | | | | | | |
| Mooney viscosity | 61 | 49 | 55 | 76 | 68 | 69 | 74 |
| [Vulcanized physical properties] | | | | | | | |
| tanδ (0° C.) | 0.291 | 0.293 | 0.299 | 0.872 | 0.891 | 0.897 | 0.883 |
| tanδ (60° C.) | 0.138 | 0.130 | 0.144 | 0.401 | 0.387 | 0.380 | 0.412 |
| Abrasion resistance (index) | 100 | 113 | 105 | 100 | 110 | 112 | 105 |

*[1]: Nipol 1502 (made by Nihon Zeon SBR)
*[2]: Nipol 9528 (made by Nihon SBR, 33.3% oil extended)
*[3]: N339 (made by Tokai Carbon, carbon black, $N_2SA$ = 92 $m^2/g$, DBP oil adsorption = 117 ml/100 g)
*[4]: N114 (made by Tokai Carbon, carbon black, $N_2SA$ = 153 $m^2/g$, DBP oil adsorption = 127 ml/100 g)
*[5]: See notes of Table I-1.
*[6]: Made by Ouchi Shinko Chemical Industrial, N-cyclohexyl-2-benzothiazyl sulfenamide
*[7]: Made by Ouchi Shinko Chemical Industrial, diphenyl guanidine Examples II-1 to II-6, Reference Examples II-1 to II-2, and Comparative Examples II-1 to II-2

The ingredients other than the vulcanization accelerator and sulfur in the formulations shown in Table II-1 were mixed in a 1.8 liter closed type mixer for 3 to 5 minutes. When reaching 165±5° C., the mixture was discharged. The vulcanization accelerator and sulfur were mixed by an 8-inch open roll with the masterbatch to obtain a rubber composition. The unvulcanized physical property (Mooney viscosity) of the rubber composition obtained was measured.

Next, the composition was vulcanized by pressing in 15×15×0.2 cm mold at 160° C. for 20 minutes to prepare the desired test piece (rubber sheet) which was then evaluated for vulcanized physical properties. The results are shown in Table II-1.

TABLE II-1

|  | Comp. Ex. II-1 | Ref. Ex. II-1 | Ex. II-1 | Ex. II-2 |
|---|---|---|---|---|
| [Composition (parts by weight)] | | | | |
| Polyisoprene rubber (IR) | 100.0 | 100.0 | 100.0 | 100.0 |
| Styrene butadiene rubber (SBR) | — | — | — | — |
| Carbon black | 50 | 50 | 50 | 50 |
| TEMPO | — | 1 | — | — |
| NHTEMPO | — | — | 1 | — |
| NCOTEMPO | — | — | — | 1 |
| Zinc White #3 | 5 | 5 | 5 | 5 |
| Industrial stearic acid | 1 | 1 | 1 | 1 |
| Antioxidant 6C | 3 | 3 | 3 | 3 |
| Oil treated powdered sulfur | 1.1 | 1.1 | 1.1 | 1.1 |
| Vulcanization accelerator NS | 1.1 | 1.1 | 1.1 | 1.1 |
| [Unvulcanized physical properties] | | | | |
| Mooney viscosity | 80 | 68 | 75 | 70 |
| [Vulcanized physical properties] | | | | |
| tanδ (0° C.) | 0.305 | 0.305 | 0.301 | 0.298 |
| tanδ (60° C.) | 0.188 | 0.186 | 0.162 | 0.168 |
| tanδ balance (0° C./60° C.) | 1.62 | 1.64 | 1.86 | 1.77 |
| Abrasion resistance (index) | 100 | 104 | 104 | 107 |

|  | Comp. Ex. II-2 | Ref. Ex. II-2 | Ex. II-3 | Ex. II-4 | Ex. II-5 | Ex. II-6 |
|---|---|---|---|---|---|---|
| [Composition (parts by weight)] | | | | | | |
| Polyisoprene rubber (IR) | — | — | — | — | — | — |
| Styrene butadiene rubber (SBR) | 100 | 100 | 100 | 100 | 100 | 100 |
| Carbon black | 50 | 50 | 50 | 50 | 50 | 50 |
| TEMPO | — | 1 | — | — | — | — |
| NHTEMPO | — | — | 1 | — | — | — |
| NCOTEMPO | — | — | — | 1 | — | — |
| MDP-TEMPO | — | — | — | — | 1 | — |
| P-TEMPO | — | — | — | — | — | 1 |
| Zinc White #3 | 5 | 5 | 5 | 5 | 5 | 5 |
| Industrial stearic acid | 1 | 1 | 1 | 1 | 1 | 1 |
| Antioxidant 6C | 3 | 3 | 3 | 3 | 3 | 3 |
| Oil treated powdered sulfur | 1.1 | 1.1 | 1.1 | 1.1 | 1.1 | 1.1 |
| Vulcanization accelerator NS | 1.1 | 1.1 | 1.1 | 1.1 | 1.1 | 1.1 |
| [Unvulcanized physical properties] | | | | | | |
| Mooney viscosity | 84 | 80 | 100 | 92 | 113.0 | 74.2 |
| [Vulcanized physical properties] | | | | | | |
| tanδ (0° C.) | 0.307 | 0.308 | 0.298 | 0.302 | 0.305 | 0.309 |
| tanδ (60° C.) | 0.226 | 0.225 | 0.212 | 0.218 | 0.218 | 0.218 |
| tanδ balance (0° C./60° C.) | 1.36 | 1.37 | 1.41 | 1.39 | 1.4 | 1.42 |
| Abrasion resistance (index) | 100 | 103 | 105 | 106 | 105 | 104 |

IR: Nipol IR-2200 (made by Nihon Zeon)
SBR: Nipol 1502 (made by Nihon Zeon)
Carbon black: Dia Black 1 (made by Mitsubishi Chemical)
TEMPO: 2,2,6,6-tetramethylpiperidinyloxy (made by Aldrich Chemical Co. Inc.)
NHTEMPO: 4-amino-2,2,6,6-tetramethylpiperidinyloxy (made by Aldrich Chemical Co. Inc.)
NCOTEMPO: 4-isocyanate-2,2,6,6-tetramethylpiperidinyloxy
6C: N-phenyl-N'-(1,3-dimethylbutyl)-p-phenylenediamine (made by Sumitomo Chemical)
NS: N-tert-butyl-2-benzothiazylsulfenamide (made by Ouchi Shinko Chemical Industrial)

MDP-TEMPO

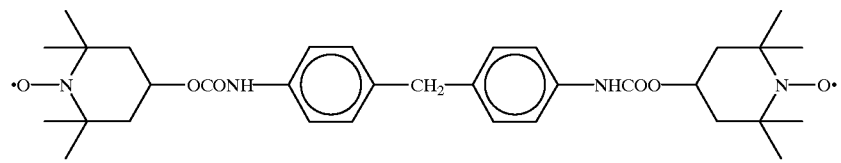

P-TEMPO

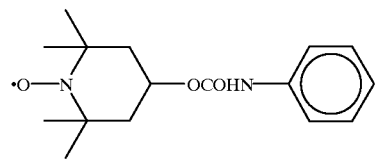

6C: N-phenyl-N'-(1,3-dimethylbutyl)-p-phenylenediamine (made by Sumitomo Chemical)

NS: N-tert-butyl-2-benzothiazylsulfenamide (made by Ouchi Shinko Chemical Industrial)

The test methods of the unvulcanized physical properties and the vulcanized physical properties of the compositions obtained in the Examples were as mentioned above.

INDUSTRIAL APPLICABILITY

As explained above, according to the present invention, by compounding a specific compound containing free radicals having a powerful radical trapping function into a rubber composition, it is possible to obtain a rubber composition where the free radicals of the rubber generated during the mixing are trapped, where the cleavage of the chains of the rubber and the generation of carbon gel can be suppressed, which is superior in processability, which is superior in balance of high grip/low heat buildup, and which is improved in abrasion resistance. Further, according to another aspect of the present invention, by introducing an amino group, isocyanate group, hydroxyl group, carboxyl group, oxirane group, or thiirane group into the specific compound containing free radicals having a powerful radical trapping function, as a substituent, and compounding the same into the rubber composition, it is possible to obtain a rubber composition which is superior in balance of high wet performance/low rolling resistance and which is improved in abrasion resistance.

We claim:

1. A rubber composition consisting essentially of (i) 100 parts by weight of at least one diene rubber, (ii) at least 40 parts by weight of at least one reinforcing agent and (iii) 0.1 to 10 parts by weight of at least one compound containing, in the molecule thereof, a radical capable of being stably present at room temperature in the presence of oxygen, selected from the group consisting of nitroxide radicals, hydrazyl radicals, allyloxyl radicals, and trityl radicals and the analogues thereof, and (iv) additives generally compounded for general rubber use.

2. A rubber composition as claimed in claim 1, wherein the compound containing radicals capable of being stably present at room temperature and in the presence of oxygen are tetramethylpiperidinyloxy and the analogues thereof.

3. A rubber composition as claimed in claim 1, wherein the compound containing radicals capable of being stably present at room temperature in the presence of oxygen are 2,2-diphenyl-1-picrylhydrazyl and the analogues thereof.

4. A rubber composition as claimed in any one of claims 1 to 3, wherein the reinforcing agent is a carbon black having a nitrogen specific surface area ($N_2SA$) of 20 to 200 $m^2/g$ and a DBP oil absorption of 60 to 130 ml/100 g.

5. A rubber composition as claimed in any one of claims 1 to 3, wherein the reinforcing agent is a silica having a nitrogen specific surface area or $N_2SA$ of 80 to 300 $m^2/g$ and a DBP oil absorption of 100 to 300 ml/100 g.

6. A pneumatic tire obtained using a rubber composition according to any one of claims 1 to 3.

7. A rubber composition as claimed in claim 1, wherein the amount of the reinforcing agent is at least 20 parts by weight based upon 100 parts by weight of the diene starting rubber and the compound containing, in the molecule thereof, a radical capable of being stably present at room temperature in the presence of oxygen has at least one substituent group selected from the group consisting of an amino group, isocyanate group, hydroxyl group, carboxyl group, oxirane group, and thiirane group.

8. A rubber composition as claimed in claim 7, wherein the compound containing radicals capable of being stably present at room temperature in the presence of oxygen is tetramethylpiperidinyloxy and its analogues.

9. A pneumatic tire obtained using a rubber composition according to claim 7 or 8.

10. A rubber composition according to claim 4, wherein the reinforcing agent is a silica having a nitrogen specific surface area or $N_2SA$ of 80 to 300 $m^2/g$ and a DBP oil absorption of 100 to 300 ml/100 g.

11. A pneumatic tire obtained using a rubber composition according to claim 4.

12. A pneumatic tire obtained using a rubber composition according to claim 5.

13. A pneumatic tire obtained using a rubber composition according to claim 10.

14. A method for trapping radicals generated in diene rubber during the mixing of a rubber composition with a radical capable of being stably present at room temperature in the presence of oxygen, selected from the group consisting of nitroxide radicals, hydrazyl radicals, allyloxyl radicals, and trityl radicals and the analogues thereof, said composition containing 100 parts by weight of at least one diene rubber, at least 40 parts by weight of at least one reinforcing agent and 0.1 to 10 parts by weight of at least one compound containing, in the molecule thereof, said radical.

15. A rubber composition comprising (i) 100 parts by weight of at least one diene rubber, (ii) at least 40 parts by weight of at least one reinforcing agent and (iii) 0.1 to 10 parts by weight of at least one compound containing, in the molecule thereof, a radical capable of being stably present at room temperature in the presence of oxygen, selected from the group consisting of nitroxide radicals, hydrazyl radicals, allyloxyl radicals, and trityl radicals and the analogues thereof, wherein the compound containing radicals capable of being stably present at room temperature and in the presence of oxygen is selected from the group consisting of tetramethylpiperidinyloxy and the analogues thereof.

16. A rubber composition according to claim 15, wherein the reinforcing agent is a carbon black having a nitrogen specific surface area or $N_2SA$ of 20 to 200 $m^2/g$ and a DBP oil absorption of 60 to 130 ml/100 g.

* * * * *